United States Patent
Gerstel

[19]

[11] Patent Number: 6,141,325
[45] Date of Patent: Oct. 31, 2000

[54] PARADIGM FOR ENABLING INTEROPERABILITY BETWEEN DIFFERENT SUBNETWORKS

[75] Inventor: Ornan Alexander Gerstel, Riverdale, N.Y.

[73] Assignee: International Business Machines Corporation, Armonk, N.Y.

[21] Appl. No.: 08/768,514

[22] Filed: Dec. 18, 1996

[51] Int. Cl.[7] .......................... G01R 31/08; G06F 11/00; G08C 15/00; H04J 1/16

[52] U.S. Cl. ............................................ 370/238; 709/242

[58] Field of Search ................................... 370/229, 235, 370/236, 237, 238, 352, 353, 354, 355, 356, 357; 395/200.68, 200.71, 200.74; 709/238, 242

[56] References Cited

U.S. PATENT DOCUMENTS

| | | |
|---|---|---|
| 4,644,532 | 2/1987 | George et al. . |
| 5,101,348 | 3/1992 | Arrowood et al. . |
| 5,109,483 | 4/1992 | Baratz et al. . |
| 5,185,860 | 2/1993 | Wu .......................................... 709/224 |
| 5,265,092 | 11/1993 | Soloway et al. . |
| 5,307,465 | 4/1994 | Iki . |
| 5,345,558 | 9/1994 | Opher et al. . |
| 5,430,727 | 7/1995 | Callon . |
| 5,473,608 | 12/1995 | Gagne et al. . |
| 5,485,578 | 1/1996 | Sweazey . |
| 5,495,479 | 2/1996 | Galaand et al. . |
| 5,509,123 | 4/1996 | Dobbins et al. . |

OTHER PUBLICATIONS

A. A. Lazar, S. K. Bhonsle & K. S. Lim; A Binding Architecture for Multimedia Networks Sep. 18, 1994; pp. 1–24.

A. A. Lazar, A Real–Time Management, Control and Information Transport Architecture for Broadband Networks; Jan. 19, 1992; pp. 1–17.

D. Giroir; Connetionaless Directory Services; TDB v38 n12; Dec. 1995; pp. 481–484.

*Primary Examiner*—Ajit Patel
*Assistant Examiner*—Bob A. Phunkulh
*Attorney, Agent, or Firm*—McGuire Woods; Wayne L. Ellenbogen, Esq.

[57] ABSTRACT

The invention provides a method for improving network routing calculations for routing data packets or connections between two points in a network through many incompatible sub-networks. Each node in the network comprises a plurality of agents, written in migrating executable code, which represent each sub-network or domain in the overall network. Hence, an originating node wishing to send data over the network need not concern itself with the topology of the links or communicate directly with other sub-networks. Instead, the originating node can calculate a path through the network locally, simply by querying its agents. Hence, this paradigm is based on an object-oriented design, in which the network controller (NC) at one node does not attempt to interpret topological data of a different node or sub-network. Instead, a network controller at the originating node activates the agents which represent the other sub-networks, and queries the agents (a black-box approach). Only the agent interprets the relevant topological data.

18 Claims, 11 Drawing Sheets

| Name | Input | Output | Description |
|---|---|---|---|
| FindAddress | a node address | true if the node owns the address | Avoids the need for a standard address format – network control just asks all its node agents if a given address is inside them, until one takes responsibility for the address. This is some sort of name service. |
| MinDelay | needed bandwidth, QoS, a pair of ports | Min propagation delay of route that supports the BW & QoS between the given ports (∞ if no such route exists) | The main interface, used by the route computation alg. of network control to find an end-to-end route which can support the required BW and QoS and has min. propagation delay. |
| MinCost | same as for MinDelay + a bound on the delay | Lowest cost path that supports the QoS, BW, and delay constraints | Additional interfaces (referred to as "MinXYZ" herein) or variants thereof are the main difference between different standards that use the scheme. |
| Topology Upd | private topology update from subnet | N/A | Allows the subnet's agent to update its internal topology & utilization data. |
| SetupMsg | ID of a route that was computed by a MinXYZ interface | A setup message in the subnet's private format | Will be aggregated by network control together with setup messages of other subnets en-route to the destination into a full setup message. |

| Type | Version |
|---|---|
| 1 | N |

| Nodes | | | Links | | | |
|---|---|---|---|---|---|---|
| ID | Type | | ID | Endpoint1 | Endpoint2 | Delay |
| S1 | vendor X | | L1 | S1.port1 | S2.port1 | 20 |
| S2 | standard Y | | L2 | S1.port3 | S2.port2 | 100 |
| r1 | simple | | L3 | r1.port2 | S1.port2 | 5 |

FIG.7B

| Type | Subnet Type | Agent code in Java, with the standard interfaces |
|---|---|---|
| 2 | vendor X | |

FIG.7C

| Type | Subnet ID | Private update of topological and utilization data for the agents of S1 |
|---|---|---|
| 3 | S1 | |

FIG.7D

| Type | Length | Private setup message for 1st (super)node | Length | Private setup message for 2nd (super)node | Length | Private setup message for 3rd (super)node | ... |
|---|---|---|---|---|---|---|---|
| 4 | | | | | | | |

FIG.7E

| Type | Reverse path | | | | Ack/Nack | Reverse path | | | ... |
|---|---|---|---|---|---|---|---|---|---|
| 5 | Private port ID | Private port ID | Private port ID | | | Private port ID | Private port ID | Private port ID | |

Legend:
- ▨ Private (non-standard) format
- ☐ Standard fields
- r1 — An ID of a simple (internal) node
- S1 — A global ID of a supernode (representing a subnet)
- port1 — A local port ID

| Name | Parameters | Type | format | i/o | description |
|---|---|---|---|---|---|
| FindAddress | Address | fixed length (64 bits) | private | in | a node's global address |
| | BelongsToMe | boolean | standard | out | true if address belongs to subnet |
| MinDelay | QoS | compound structure | standard | in | see text |
| | Port1, λ₁ | PortID, WaveLenID | standard | in | see text |
| | Port2, λ₂ | PortID, WaveLenID | standard | in | see text |
| | Delay | integer (in ms) | standard | out | min. delay through subnet |
| | pathID | fixed length | private | out | see text |
| TopologyUpd | SubnetMsg | variable length | private | in | the update from the subnet |
| SetupMsg | pathID | fixed length | private | in | generate setup message for this ID |
| | Data | variable length | private | out | the actual setup message |

FIG.9

PARADIGM FOR ENABLING INTEROPERABILITY BETWEEN DIFFERENT SUBNETWORKS

BACKGROUND OF THE INVENTION

1. Field of the Invention

The present invention generally relates to network route computation through autonomous or administrative domains and, more particularly, to an object oriented approach for controlling a network comprising sub-networks that employ different link-state control schemes, either because they are operated by different operators or because they comprise equipment from different vendors.

2. Description of the Prior Art

In large communication networks, such as the Internet, it is a challenging task to route a packet of data from one node to another. A network of this type often comprises many sub-networks which, in turn, are comprised of many nodes. These sub-networks are often of different and not necessarily compatible, such as, for example, token ring networks, wide area networks (WANs), and many different proprietary networks. Even if data formats are identical, control protocols for these networks are usually very different. To get a packet of data from Node A to Node B, it is conceivable that the data packet will have to pass through many different sub-network systems along the way. Hence, prior to sending the packet, the network controller (NC) at the originating Node A must package the packet with all of the proper routing and syntactical data to ensure that each system along the route understands what it is to do with the packet. Alternatively, in a connection oriented network, a route must be set across the network with different control schemes.

There are often many possible paths or routes connecting any two points or nodes through different sub-networks. Some paths may be faster, some longer, some shorter, and some less expensive than others. Hence, the path chosen may be a function of many parameters particular to the data being sent. This is sometimes referred to as quality of service (QoS) parameters. In many network control schemes, termed link-state routing, the particular path chosen is the job of the network controller (NC) at the originating node. Most network control standards for complex networks are based on "link-state" routing. That is, a replicated topology database representing the whole network exists in the NC at each node in the network. This permits the NC at the originating node to calculate an appropriate path and thereafter package the packet with all of the necessary routing data appropriate for that chosen path (source routing). Similarly, in a connection oriented network, NC packages a control message with this source route. The message notifies the different NCs along its route to set up a connection.

As sub-networks, sometimes referred to as .domains., are added to and removed from the network, the topology database at each node in the network is updated by passing control messages between the various nodes in the network. Such updates most notably include periodic topology and utilization updates.

In order to enable topology updates, a rigid standard or paradigm for the topological data has to specify a fixed structure for the messages (syntax), as well as how they should be understood by network control (i.e., its semantics). The most prominent examples for this paradigm is the Private Network-to-Network (PNNI) standard for inter-network control of asynchronous transfer mode (ATM), and the Open Shortest Path First (OSPF) standard for Internet intra-domain routing. In other words, the network controller (NC) must know the standards and control format for each sub-network within the network. Often times the various standards of the sub-networks vary greatly thus requiring the NC at each node to replicate many standards and protocols.

This problem has been addressed to some extent in, for example, U.S. Pat. No. 4,664,532 to George et al. which shows a method for automatic topology updating in a hybrid network. Selected nodes in the network are provided with extended memory and computing capabilities and each maintains a topology data base for the network. The other nodes in the network are provided with smaller memories and computing capabilities and maintain information related solely to the topology of the local sub-network. In this case, only the selected nodes need to be updated with network topology when a change in the network occurs.

A drawback of this rigid paradigm is that it is very hard to modify existing standards as technology evolves, since backward compatibility must be maintained. This is even true for proprietary protocols, since the whole sub-net must be upgraded simultaneously to enable interoperability. That is each time a new sub-network is added, each node in the network must be provided with the protocol. Alternatively, it is required to agree upon a single standard for network control. This process is very difficult and yields less than optimal control schemes that aim at the least common denominator.

The practice of topology aggregation is used in most of the standards and implementations of scalable networks. Topology aggregation refers to the reduction of complex topological data into smaller and simpler data which approximates the original data. A few examples of topology aggregation are the single level aggregation of Decnet (areas/hosts), the two level aggregation of IP (autonomous systems/networks/hosts), and the unbounded aggregation of the PNNI standard for ATM.

Several methods and schemes have been proposed for reducing the amount of data needed to be sent to the individual nodes during a network topology update. For example, U.S. Pat. No. 5,101,348 to Arrowood et al. describes a method for reducing the amount of data passed during topology updates. It assumes that all the nodes employ the same control mechanism and therefore does not address the case of integrating different control schemes into a single control plane.

Similarly, U.S. Pat. No. 5,265,092 to Soloway et al. focuses on providing a loop free, shortest path routing algorithm for data packets. It assumes that all the nodes employ the same control mechanism. However, Soloway does not address integrating different control schemes.

U.S. Pat. No. 5,509,123 to Dobbins shows an object oriented architecture or network layer routing which distributes function and system behavior in autonomous router objects. However, Dobbins only recognizes distance vector routing and is therefore not applicable to link-state routing suitable for connection oriented networks. As such, Dobbins enables different networks to co-exist without interaction but does not permit different networks to inter-operate.

Along a slightly different vein, U.S. Pat. No. 5,430,727 to Callon is directed to multiple protocol routing for networks which routs data from different protocols by the same routers, thereby sharing the router hardware as well as the topological data and updates.

SUMMARY OF THE INVENTION

It is therefore an object of the present invention to provide an object oriented approach to network topology to facilitate standardization processes.

It is yet another object of the present invention to provide a method for improving network routing calculations for routing data between two points in a network which may be comprised of many incompatible sub-networks.

According to the invention, software agents representing each sub-network in the network are present at each node. The agents are written in an object oriented, migrating executable code, such as, Java or C++. Migrating executable code is code which can be downloaded over a network from a server to any client for which an interpreter or compiler has been written. Networks, such as the Internet, involve the interaction of many different machines all having different microprocessors understanding different instructions sets. Hence, a program compiled for, say an IBM machine, will not ordinarily run on a non-IBM compatible machine.

Unlike ordinary compilation methods which compile source code into an instruction set for a particular hardware CPU, migrating executable code, such as JAVA, is compiled into a bytecode file. This bytecode file contains a set of instructions for an imaginary CPU. These bytecodes cannot be fed directly to any real CPU because no real CPU understands them. Rather, a JAVA interpreter for the particular hardware translates the bytecodes into an instruction set that the real CPU hardware understands. The advantage to migrating executable code is that it is compatible on all hardware for which there is an interpreter. In the case of C++, the agent source code can be transmitted to the client machine from the server. The client machine can thereafter locally compile the agent source code.

The present invention takes advantage of this multiplatform compatibility. According to the invention, each node in a network comprises a plurality of agents, written in migrating executable code, which represent every other sub-network or domain in the network. It is noted that the term sub-network (sub-net) may represent a single node or an entire sub-network or domain comprised of many nodes. Hence, an originating node wishing to send data over the network, perhaps through many incompatible sub-networks, need not concern itself with the topology of the sub-networks or communicate directly with the sub-networks. Instead, the originating node can calculate a path through the network locally, simply by querying its agents representing the sub-networks.

For example, suppose a network comprises Nodes A, B, C, and D, where each node can either be a single node or a sub-network comprising many nodes. Each node in the network comprises a network controller (NC). Further, each node has previously sent to every other node in the network its agent written in a migrating executable code. Hence, each NC has resident therein an agent which represents every other node, or at least every other domain, in the network. In addition, each node comprises a topology map database which shows how all of the different nodes or domains are linked.

In operation, if node A wishes to send a packet of data to address 12345, Node A first queries its agents for which one of them contains the address 12345. Only one of the agents will respond in the affirmative; in this example, the agent for Node D reports that Node D contains the address 12345. Thereafter, based on the topology map database, the NC at Node A will compute a path from Node A to Node D based on certain criteria for the data, such as, bandwidth, quality of service (QoS), cost factors, etc. The NC at Node A locally queries the resident agents to obtain this information and thereafter computes the best route accordingly.

Hence, this paradigm is based on an object-oriented design, in which the network control (NC) at one node does not attempt to interpret topological data of a different sub-net. Instead, network control activates an agent which belongs to the other sub-net, and queries the agent (a black-box approach). Only the agent interprets the relevant topological data. As a result, the standard for topology aggregation, addressing scheme, and connection setup/takedown are minimized to a fairly generic interface of the agent instead of the very involved standards which current paradigms necessitate.

BRIEF DESCRIPTION OF THE DRAWINGS

The foregoing and other objects, aspects and advantages will be better understood from the following detailed description of a preferred embodiment of the invention with reference to the drawings, in which:

FIG. 3 is a chart showing the interfaces of an agent representing a sub-network;

FIGS. 7A–E is a group of charts showing the main standard messages of network control according to the preferred embodiment;

FIG. 9 is a chart showing the interface of optical sub-net agent;

DETAILED DESCRIPTION OF A PREFERRED EMBODIMENT OF THE INVENTION

Figure 1:
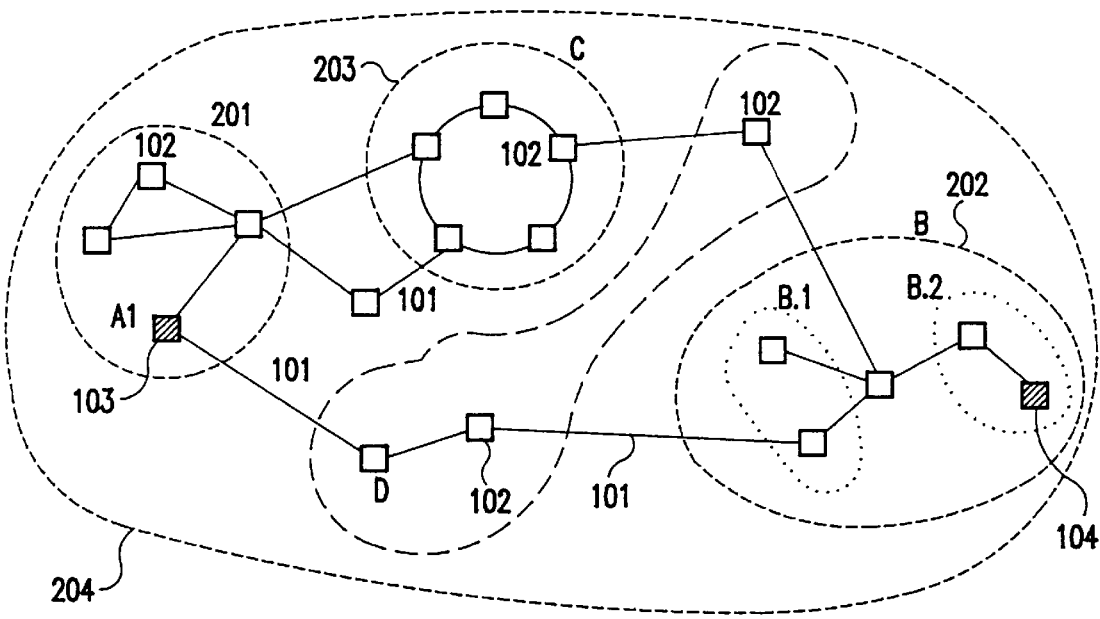
FIG. 1 is a diagram of an example of a network composed of separate domains or sub-networks.

Referring now to the drawings, and more particularly to FIG. 1, there is shown a pictorial demonstration of an example network 204 comprising three sub-nets A, B, C, and D, respectively. In this illustration, sub-net A (domain A) is a proprietary network, sub-net B is a ring network, sub-net C is a hierarchical network, and sub-net D is a wide area Network (WAN). Each sub-net comprises nodes, 102, 103, and 104, connected to each other by links 101. Each of the sub-nets is likewise interconnected by links 101. The sub-nets A, B, C, and D all require different operating protocols.

Figure 2:
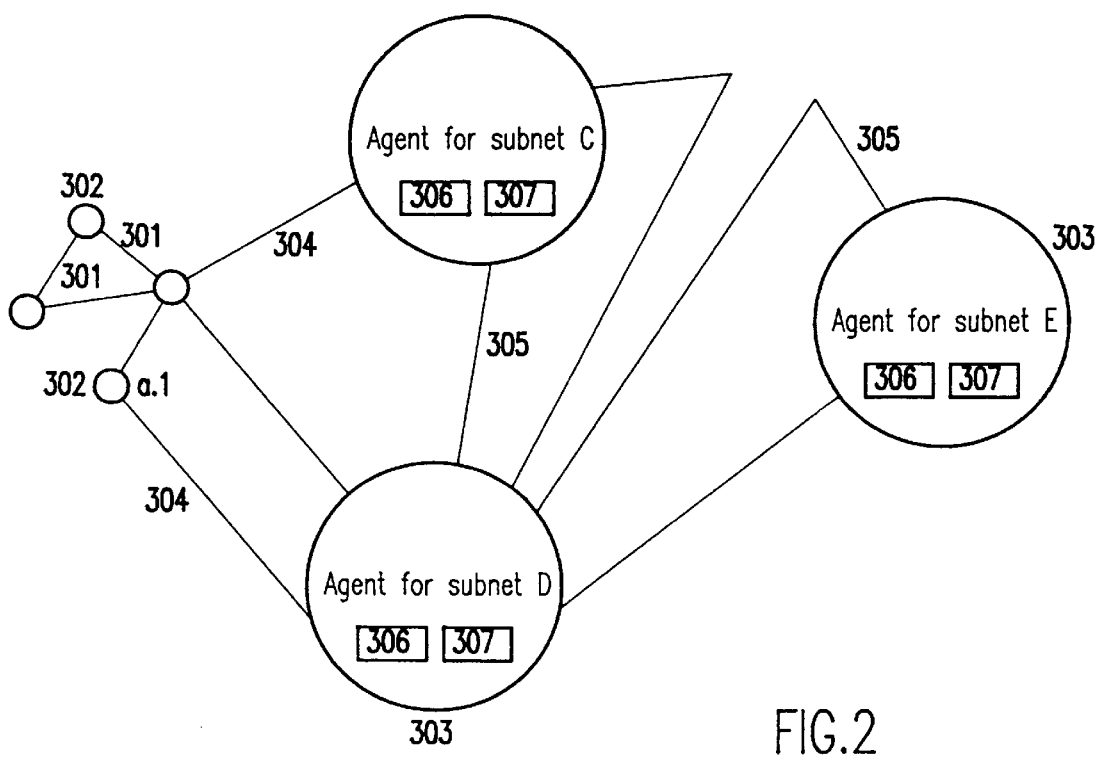
FIG. 2 is a diagram of a hierarchical topological view of the network shown in FIG. 1 as seen by a node in sub-net A.

Referring to FIG. 2, there is shown a projection in the local high-level topology view of the network as seen by node A1 in sub-net A. This view consists of regular nodes 302 which represent nodes in the same sub-net as the node A1 and super-node 303 which represent several different sub-nets. The view also contains links 301 within the node's sub-net A, links 304 between nodes in A to nodes in other subnets and links 305 between nodes in different sub-nets (other than A). Note that the view of the same network as seen from a different node will be different.

In addition to the high-level topology map, each node has to maintain information on the internals of each sub-net, since paths through different sub-nets may have very different characteristics. Instead of having to standardize the data maintained for each sub-net (as done in prior art) each node in the high-level topological view has a software agent 306 associated with it, residing at the local memory of network control (NC) at each node, as part of the topology database. This agent 306 is programmed according to the specific properties of the sub-net it represents and comprises its code and its storage 307. All information the network control at Node A1 knows regarding nodes in other sub-nets is acquired through standardized interfaces of their respective agents (i.e., a "black box" approach). Topology updates for other nodes travel in the network in some vendor-specific format, with very few standard fields, amongst which a logical address that enables network control at A1 to direct the update to the appropriate agent. Upon receipt of an update, the agent 306 processes it, and updates its internal data structure storage 307.

The characteristics of each node or sub-net is maintained by an agent, which knows the specifics of the entity it represents. For example, the agent of sub-net C is aware of the fact that sub-net C is a ring, and is specialized to deal with this topology.

Prior to operation, the network must obtain the agent code for each node. When a new node joins the system, it lets its neighbors know its .type., which determines the agent which represents it. The type of a node may be its vendor (e.g., IBM), or a standard it complies to (e.g., PNNI low level node), a type of a supernode or domain may be a network operator (e.g., AT & T or America Online$^{SM}$) which runs the sub-net, a standard (e.g., PNNI aggregated topology), or a sub-net type (e.g., LAN, RING, etc.). More often than not, the neighbors will already have agents of the same type. Hence they will already have the code of the new node's agent, and will not need it to be shipped to them. Otherwise, the new node will update the rest of the network with the code of its agent, encoded in some hardware independent standard format, such an JAVA.

As far as the topology database of the new node itself is concerned, it will receive the high-level topology (links, nodes and the type of each node) from one of its neighbors by means of a high-level topology update. This update may also include the code for each of the agent types. Ideally, the new node will explicitly request the code for agent types it does not already have.

It is noted that the present invention finds application in network architectures using either circuit connection switching or packet switching. Briefly, in packet switching, the network forwards independent data packets, each containing routing information to get the packet o a destination address. In circuit switching, the network sets up a connection across the network using a setup protocol. Once a connection is set up, the source can send packets on the connection by specifying in each packet an ID which will enable each node in the connection path to know that the packet belongs to this connection and forward the packet accordingly.

Figure 4:
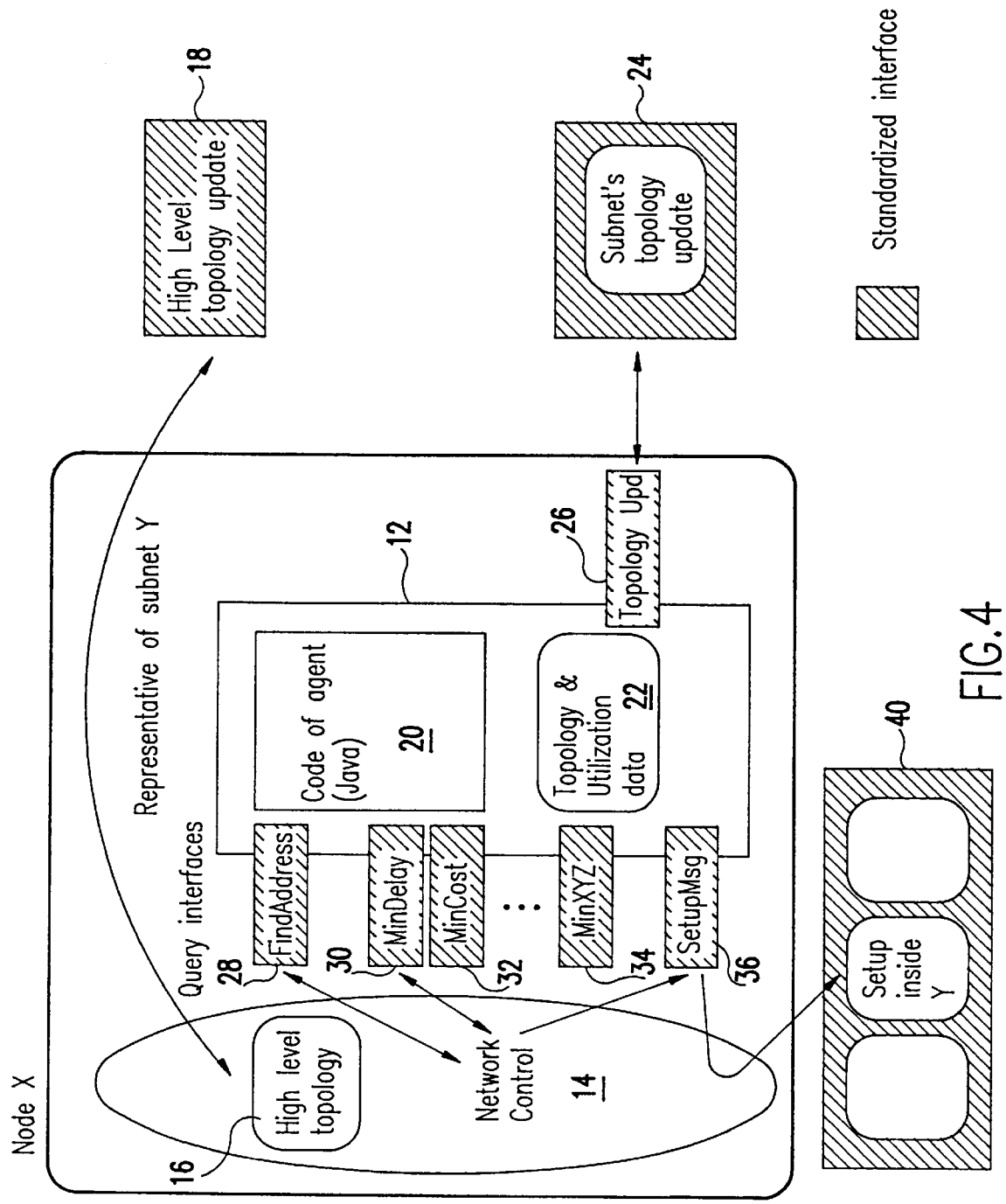
FIG. 4 is a block diagram illustrating the roles of an agent.

Referring now to FIGS. 3 and 4, FIG. 3 shows a chart detailing the functions of an agent and FIG. 4 is a representative diagram. Specifically, each agent comprises a Find Address function, a Minimum Delay function, a Minimum Cost function, a Topology Update function, and a Setup Message function. Each are discussed in more detail below.

The Find Address function (FindAddress) avoids the need for a standard address format. The NC simply asks all of its node agents if a given address is inside them, until one of the agents takes responsibility for the address. Nodes complying with a hierarchical scheme may look at the relevant prefix of the input to decide (for example, "any address of the form 2.3.*.* is mine"). Other nodes may just have a list or a range of all addresses supported by them. Even here, the current scheme is more flexible than other inter-networking addressing schemes (e.g., the PNNI interface of the ATM forum or address resolution in current internet protocol (IP) and next generation IP (IPng)).

An example where such a scheme could have avoided problems is the addressing scheme of IP networks. Due to the growth of the Internet, the "class B" address format has been completely allocated. As a consequence, a new addressing scheme was adopted, and a fairly painful migration was initiated to support the new scheme in the routers. Using the current scheme, an Internet sub-net could have transparently adopted several smaller address domains, avoiding the migration process. The internet is partitioned into administrative domains with private intra-domain routing protocols. Between the domains an inter-domain routing protocol is deployed. An example of an inter-domain routing protocol is the internet's IDRP (RFC 1322). According to the present invention, and having a node in the high level map for each domain and an agent representing the internal structure and consideration of the domain, it is possible to agree on a much simpler inter-domain routing protocol for connection with quality of service (QoS) constraints (for example, ReSource reservation Protocol (RSVP), an internet draft).

Figure 5:
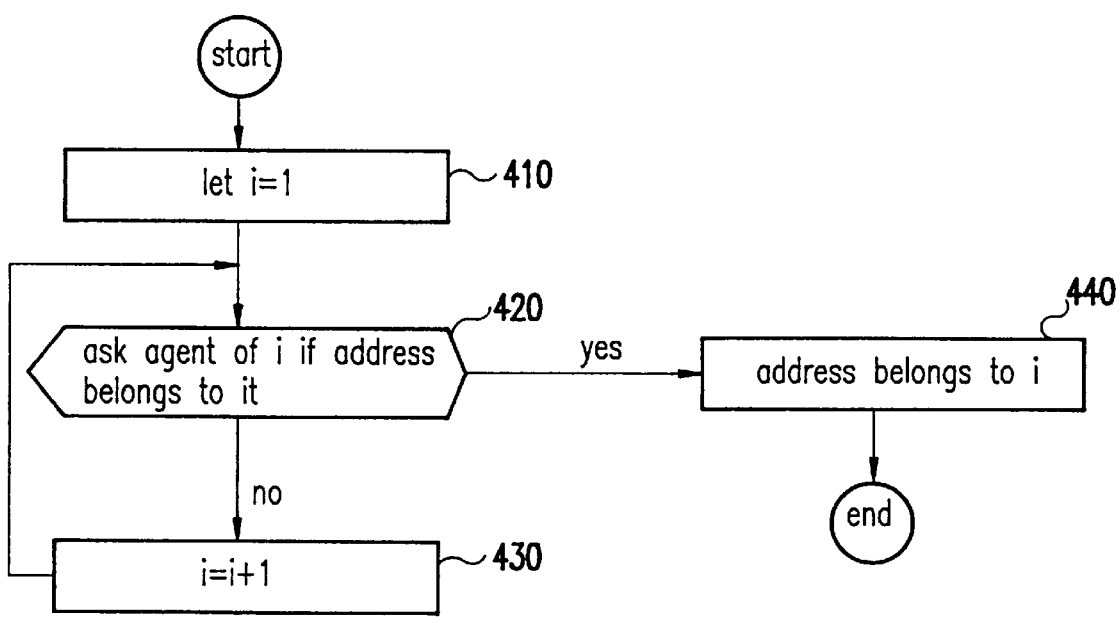
FIG. 5 is a flow-diagram for the address resolution algorithm.

Referring to FIG. 5, the agents' FindAddress function works as follows. The necessary data at each node is an unstructured collection of agents, each representing the address space of a sub-net. Given an address X we search for the sub-net i which contains X. In Step 410 we let i=1. In Step 420 we query sub-net i if X belongs to it. If so, the search can terminate at Step 440 (or continue, if this is a multicast address). In Step 430, i is incremented to i=i+1 and loops back to Step 420 until an agent takes responsibility for the address.

Referring again to FIG. 3, the agents' Minimum Delay (MinDelay) function is used to calculate an appropriate path to route the data packet to the sub-net containing the requested destination address. This path is calculated based on such factors as bandwidth requirements, quality of service (QoS) requirements, and propagation delay. The various sub-nets or supernodes may choose different schemes for aggregating the topology. For example, some will have full knowledge of their internal sub-net's topology (no aggregation, but still independent format), some will have PNNI or IDRP aggregation, and some even simpler structures, not requiring updates at all. For example, a sub-net that accepts any 64 Kbps connection with fixed QoS, and only guarantees some fixed upper bound on the delay (any connection request with more demanding requirements is rejected by returning infinite delay) does not need topology updates at all.

Even if no aggregation is done at a supernode and the full sub-net topology is maintained by each of the sub-net's agents, the internal structure of the sub-net will be part of the agent's private wisdom, which can be exploited to return accurate information using very efficient updates and algorithms. For example, an agent that represents a ring network can use specific route computation algorithms which only work well for rings.

The Minimum Cost function (MinCost) is another example for a route computation function, based on the actual cost in dollars, rather than the delay. The cost could depend on complex tables which take into account the time of day and other considerations which are certainly different for different network operators. Thus, no standard is likely to be agreed upon for such cases, using traditional methods. The variety of implementations for this case is large. For example, some operators offer a flat rate, requiring no distributed data maintenance whatsoever, others offer some fixed set of rates, based on distance, time-of-day etc., requiring a more complex data structure, but no periodic updates. At the other extreme are systems which offer costs that vary depending on current load conditions, and require frequent utilization updates.

The Topology Update function (TopologyUpd) allow the subnet's agent to update its internal topology and utilization data. Data transferred in an update will be specific to the sub-net it represents, with no standard structure. An extreme aspect of this approach is security. organizations that do not want to reveal their internal considerations may even encrypt the updates so that only their agents will know what is in them. The only standard field in the message format is the ID of the sub-net, which enables network control to direct the message to the relevant agent.

Even this standard field can be replaced by adding some computational overhead. For example, the network control may ask each agent in its topology database if the message belongs to it, and receives a boolean answer indicating if the message did belong to it, in which case network control stops asking the rest of the agents.

The Setup Message function (SetupMsg) will be aggregated by the network control together with setup messages of other sub-nets along the calculated path. When the route has been decided upon, network control asks each agent to provide its vendor specific setup format for the part of the connection it has committed to. Network control appends all these messages to a setup request, which is routed along the connection route to arrive at each sub-net on the path. The gateway node to the sub-net interprets the vendor specific message to setup the route inside the sub-net (between the required entry and exit points).

The new paradigm offers here room for different vendor-specific setup options. Some sub-nets may have a centralized setup facility to which the setup message is forwarded, while other sub-nets may use source routing for the message (with the address list being incorporated into the message by the agent). Other networks may choose not to specify a route in the setup message, but dynamically compute it when the setup message arrives.

To finish the setup process, an acknowledgment is sent along the path back to the source of the request (alternatively, a negative acknowledgment(nack)is sent if the setup cannot be completed). Since the source cannot (and need not)specify an explicit path for the setup message, such a path is accumulated in this message as it propagates along its route. This path can be based on locally valid addresses (such as local ports in each node), as it only needs to be understood by the very same nodes that write this reverse path in the setup message.

Referring now to FIG. 4, there is shown a block diagram illustrating the roles of an agent. The diagram shows some Node X 10 comprising an agent 12 representing a sub-net Y and other agents representing other sub-nets which are not shown. The Network Controller (NC) 14 of node X 10 comprises a high level topology map database 16 for the entire network which is updated by a high level topology update 18. The agent of Y 12 is written in a platform independent migrating executable code 20, such as, for example, JAVA, and also contains topological and utilization data 22 of Y. The topological and utilization data 22 may be updated to reflect changes in Y's topology via a topology update message 24. The data is fed into the agent using a topology update function (TopologyUpd) 26. The agent comprises the various functions discussed above such as FindAddress 28, MinDelay 30, MinCost 32, SetupMsg 36, and perhaps other routing functions represented as MinXYZ 34. Once a path is calculated, the SetupMsg function 36 is used to produce a setup message for Y's sub-net 41. These messages are aggregated by the network control together with setup messages of other sub-nets along the calculated path to form an end-to-end setup message 40.

Figure 6:
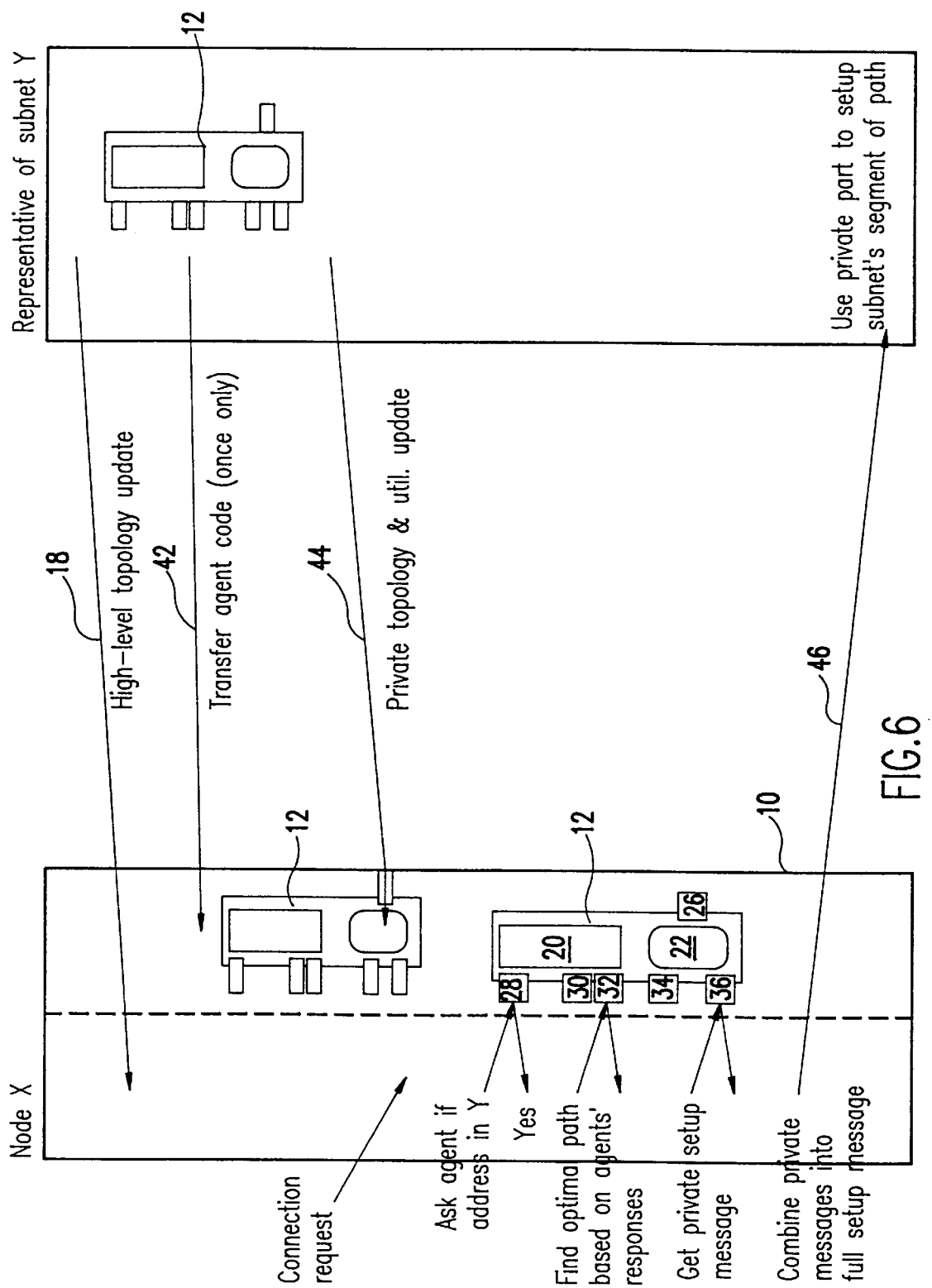
FIG. 6 is a diagram illustrating the process of updates and connection setup.

Referring now to FIG. 6, there is shown a diagram illustrating the process of updates and connection setup. Following the same convention as that shown in FIG. 4, Node X is shown comprising a plurality of agents 12 for various sub-networks. Node X comprises a high level topology map database for the entire network which is updated by a high level topology update 18. The agent code 12 for each type of sub-net in the network is transferred 42 once to node X. Additionally, private topology updates 44 are provided for which periodically update a sub-net's agent on changes pertaining to the agent. In operation, for example, an originating Node X will query its local agents as to which of them contains a certain address. If, for example, Node Y answers in the affirmative at function 28, Node X will proceed to calculate a path to Node Y based on the responses of its local agents to queries related to minimum delay functions 30 and/or minimum cost considerations 34. Thereafter, Node X will obtain from all agents in the calculated route private setup messages for each sub-net in the path. These private messages are combined into a full setup message 46 which is appended to a data packet and sent out over the network to setup the message and eventually arrive at the correct address in sub-net Y.

The new method according to the present invention involves shipment of agent code across the network. This fact does not, however, create a substantial overhead, since the amount of code involved in an agent is not necessarily large. In fact route computation and similar algorithms that are part of the agent's implementation typically take at most a few thousands of lines of source code.

To further optimize the code shipment part, the network control database could be pre-configured to already have the code of popular agents, or be added the code manually via some external storage device (e.g., a diskette).

The use of a platform independent code poses some computational overhead. Current technology for such code, in the form of JAVA, typically consumes up to a factor of a hundred more CPU time than optimizes C++ code, most of which stems from the interpreter of its bytecode. Solutions to this problem are underway, in the form of "just in time" (JIT) compilers, that compile the byte code on the target machine upon arrival from the network. Such compilers are expected to be only a factor of five away from optimized C++ code, which is a reasonable factor in many cases.

An even more efficient alternative is to ship standard C++ code instead, and to actually compile it and dynamically link it to the network control. This option is reasonable since code shipment is rare enough to render the overhead of compilation negligible.

The fact that remote code is executed at part of the network control context creates a security threat. Such code could sabotage the operation of network control by consuming too much CPU, by extracting confidential data from network control, and even by damaging its permanent (disk)

storage. To avoid such threats, the runtime environment in which this "untrusted" code is embedded should be carefully designed. For example, it should not allow the agents to write to the disk at all, or only to specific storage per agent. In addition, standard techniques for fair resource utilization should be deployed (such as preemption in CPU scheduling or quotas in the utilization of disk space). Other means, such as authentication of the sender of the code could be considered as well.

In a second embodiment of the present invention, the above agent paradigm is applied to optical networks. The above embodiment is further refined herein to the standardization of optical networks based on WDM (wavelength routing networks). Below the discussion details the variant of the paradigm that is suitable for such optical networks.

Topology aggregation of a sub-net Y is enabled by the border nodes of the sub-net (i.e., the nodes belonging to the sub-net, which have links to nodes outside the sub-net).

All these nodes act as different ports of the same supernode, by presenting a uniform view on the sub-net. They are responsible for aggregating intra-sub-net topological data into a single node as far as the high-level topology is concerned.

Referring now to FIGS. 7A–E, the standard for an optical network comprises mainly five standard messages, and a standard interface to a sub-net's agent. Other messages exist as well, mainly for managing existing connections (e.g., probing the connection status and taking connections down), however they are similar to existing standards and do not exemplify the new paradigm. The description of these messages follows.

Referring to FIG. 7A, the standard message .High-level topology update. enables network control to determine the high-level topology of the network, in the form of a graph comprising of nodes and supernodes, each with a designated type, and links connecting the (super)nodes. Further, each link may comprise a small set of parameters, most notably its propagation delay, but possibly also its signal-noise-ratio (SNR), crosstalk, and other QoS parameters.

This topology is based on global IDs for sub-nets (S1 and S2 in FIG. 7A), local IDs of internal sub-net nodes (r1, and r2) and local port IDs (port 1, port 2). The updates are disseminated by flooding (using standard techniques) and have a version number to ensure old updates are distinguished from new ones.

Assuming no changes in the network topology, this message still changes when crossing the border between sub-nets. The border node is responsible for imploding all the internal nodes in the message (all of which belong to the sub-net) into a single supernode.

Referring now to FIG. 7B, an .Agent code. message updates the rest of the network with the code of a new agent representing a sub-net of type X. The main part of the message is the agent code, expressed in compiled Java bytecode (or any other platform independent code). This code should have the interfaces specified below.

Referring now to FIG. 7C, the message .Sub-net topology and utilization update. contains the data that a sub-net's operator (or vendor) chooses to disseminate to all its agents in other sub-nets, so as to enable them to determine feasible routes through the sub-nets and their quality. This data is in a private format, as it needs to be interpreted only by the agents of the sub-net network control know to which agent should the message be directed by the sub-net ID in the header.

Figure 8:
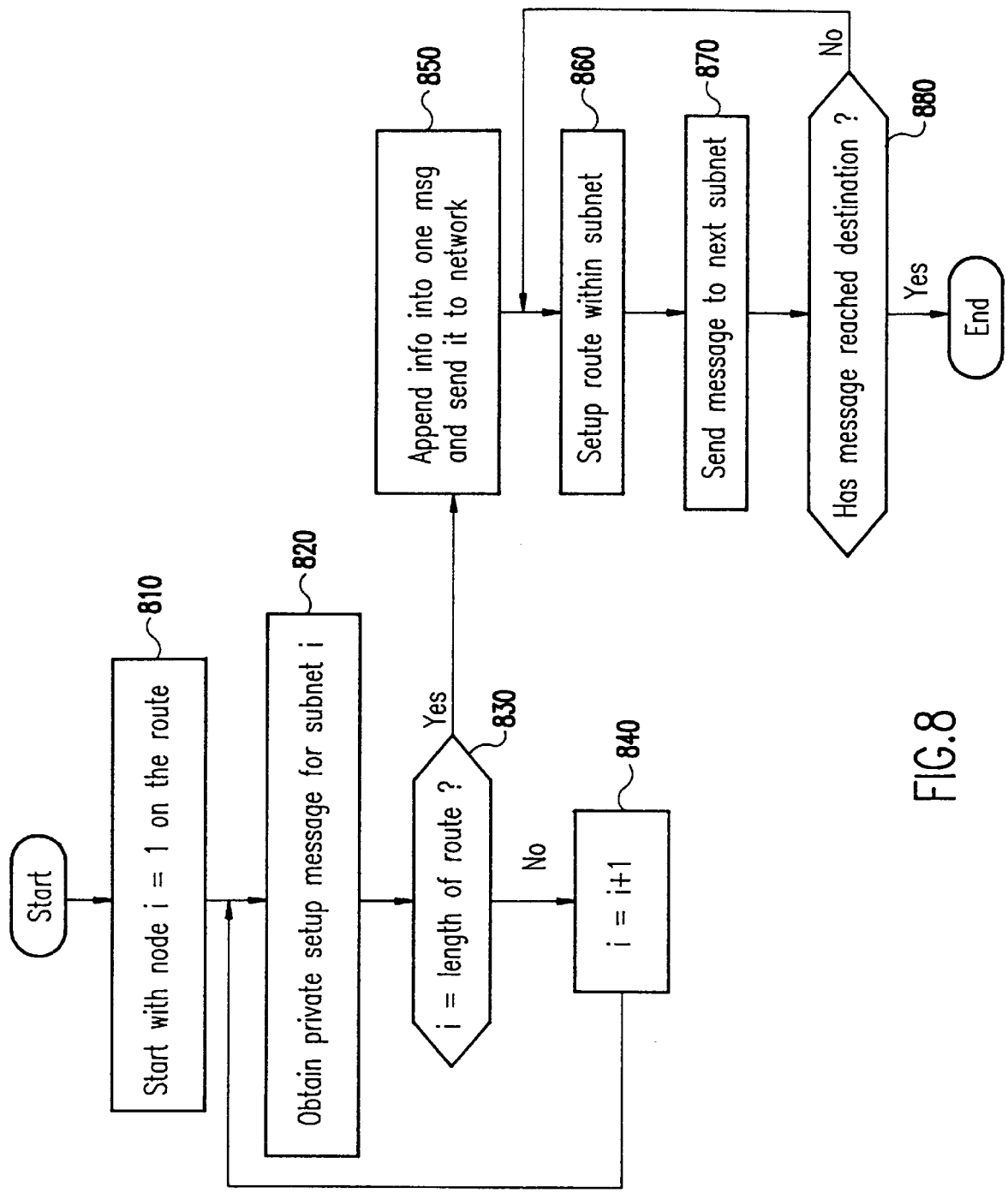
FIG. 8 is a flow-diagram for the route setup algorithm.

Referring now to FIG. 7D. Setup message. comprises multiple sub-net specific setup messages, to enable each sub-net on the route to set the connection through the optical network. FIG. 8 is a flow diagram illustrating steps taken for setting up a connection.

Given the route for the connection the source node scans all the regular and super-nodes in Step 810–840 starting with Node i=1. For each node the source node obtains private setup messages from the agent representing the sub-net (and simpler information from each regular node) at Step 820. Each private setup message should contain enough data for the sub-net to setup the route with the promised performance guarantees, and to propagate the message to the next sub-net en-route to the destination. The Node i is incremented until at step 840 i is equal to the length of the route at step 830. At Step 850, at the end of this local phase, network control at the source appends all the setup messages into a single message and sends it to the network. As the message goes from one sub-net to the next at Steps 860–870, each sub-net sets the state of the nodes to support the new connection. At Step 860 each sub-net adds its private information to the end of the message, to construct an extended path ID that would uniquely identify the connection to each sub-net. This ID should also contain enough information to enable any node on the route to send control information along it (that is, from source to destination, from destination to source or from an intermediate node to either source or destination).

Referring now to FIG. 7E the Setup acknowledgment/non-acknowledgment (ack/nack) message is described. Upon successful completion of the setup message, the extended ID is made to send an acknowledgment to the source. If for some reason a sub-net en-route to the destination cannot accommodate the route (typically since other routes have been set up in parallel), that sub-net uses the partial extended ID to cancel the partially set connection along the route to the source.

Of course, additional messages are needed as well. In particular, a .connection take down. message from either source, destination, or an intermediate node is necessary. These messages will use the extended ID to identify the connection and as an address. Other such messages include a probe (to accumulate performance statistics on the connection), .connection rerouting. messages and other operation and maintenance (OAM) messages. All these messages are similar to current standards and are therefore not explained in detail. However, the novel feature is that all of them use the extended ID.

In addition to these messages, the agent code should have the interfaces specified earlier (FindAddress, TopologyUpd, and SetupMsg), and the following MinDelay interface, specialized for optical networks. FIG. 9, is a chart showing the actual setup parameters. Additional MinXYZ interfaces could be specified as well, however they all share the same interface, the only difference being the interpretation of the returned values. While MinDelay returns the delay of a route in milliseconds, MinCost returns the dollar cost of the route, MinSNR returns the SNR associated with the route and so on.

The first input to MinDelay is the QoS requirement for the connection, including its maximum SNR tolerance, its transparency requirement (is the connection expected to use a specific protocol, such as SONET, or can it run different protocols, some of which may be proprietary), and its backup requirements (is the sub-net expected to reroute the connection to an alternate route in case of a failure, or is the protection provided outside of the sub-net's scope). Another input is a pair of port IDs between which the route should be established in the sub-net (or simple node). To accommodate connections that end inside a different sub-net, the second port (Port 2) can also be an address inside the sub-net. For each port, it is also necessary to specify the wave length to be used for the connection.

MinDelay returns two values: (1) the minimal delay associated with the route, or infinite delay if no such route exists, and (2) a route ID which identifies the route to the sub-net. This ID is used to refer to the route after the route-computation process is complete, and network control constructs the setup message by asking each agent to provide it with a private setup message for the route.

Note that repeating calls to MinDelay with different ports and wavelengths will enable network control to construct a WP×WP matrix, W being the number of wave lengths and P being the number of ports of a (super)node. In this matrix the value in each entry represents the delay for the given pair of ports and wavelengths. As noted below, this matrix suffices to compute the optimal route (assuming that each agent knows the optimal route in its sub-net).

With regard to route computation, any route computation algorithm which has been suggested for optical networks may be used with the current paradigm as well. It is even possible to find an optimal route (with minimum delay) by extracting the above mentioned WP×WP matrix, using $(WP)^2$ queries (this process is not terribly inefficient as the agent is queried locally—no communication is needed as the agents and their data reside in each node). Using these matrices, it is possible to construct a new graph, in which each node represents a specific wavelength in a specific port in a specific supernode. The delays on intra-sub-net links are taken from the matrix, whereas the inter-sub-net links are assigned the delays of the corresponding links in the high-level topology. It is easy to see that a shortest path algorithm in this graph will result in the required optimal path, and that this path is indeed feasible.

Figure 10A:
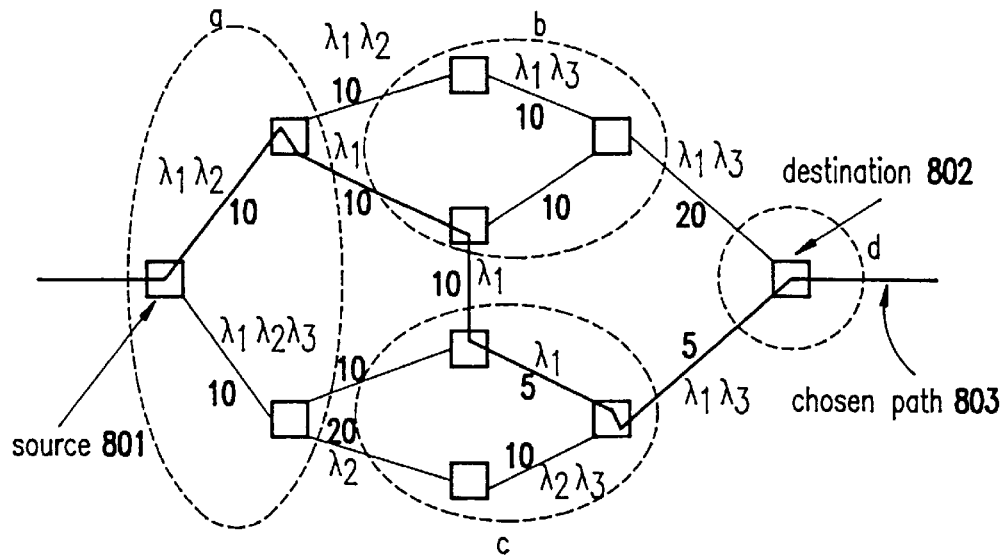
FIGS. 10A–B are diagrams exemplifying a route calculation using a shortest path algorithm on an auxiliary graph.
Figure 10B:
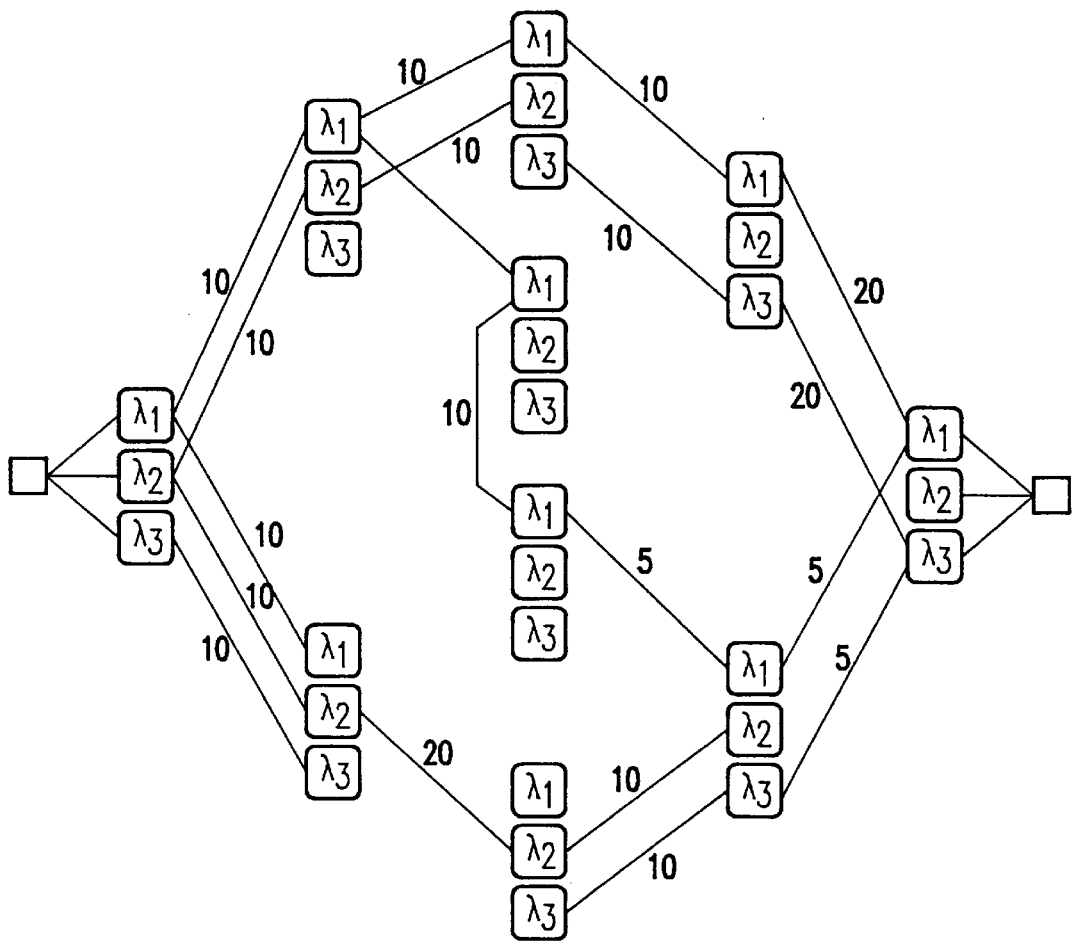
Figure 11:
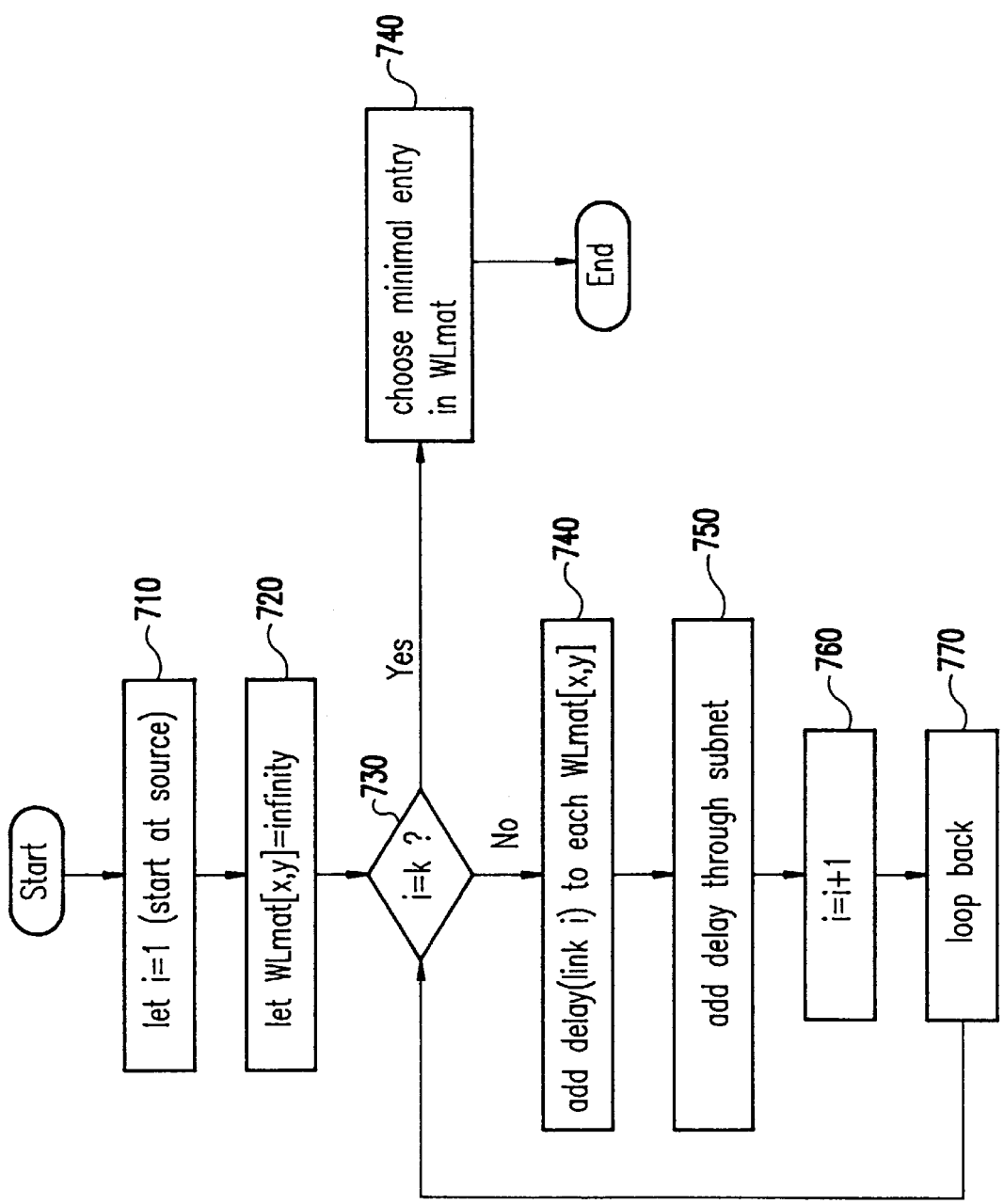
FIG. 11 is a flow diagram for the route calculation algorithm.

Referring to FIG. 10A, an example network is shown in which a route is desired between a source node 801 and a destination node 802. The algorithm chooses route 803 by finding a shortest path in the graph shown in FIG. 10B.

Trading off the optimum route for better performance, less ambitious algorithms may be devised which do not require such a huge number of queries (recall that a supernode representing a large sub-net may have dozens of ports, and that W is expected to be at least 16).

Following is described the structure of the interface between a node network control and the agent code. In the current scheme network control interfaces the agents by querying them and receiving replies. Such operations can be performed in one of two reasonable ways: (1) via procedure calls, (2) via sockets.

Assuming that the agent code is written in Java and that most of network control is written in a more efficient and compiled language (e.g., C/C++), the actual interface between the network control code and the agent code has a significant impact on the computational overhead of the proposed scheme. It also has an impact on the simplicity of the actual code. If the agent code is written in a compiled language as well, then the interface between the two entities is as efficient as possible, simply via procedure calls based on dynamic linkage, and the rest of this section is irrelevant.

The above efficient procedure call interface cannot be used if the agent code is written in Java, since the flow of control is from the non-Java part of network control to the Java part. In other words, the initiative for activating an agent's interface is from the non-Java part of network control. Since Java does not support asynchronous calls into its code, simple procedure calls cannot be used. The straightforward way to implement such calls is via sockets (supported elegantly by Java).

Figure 12B:
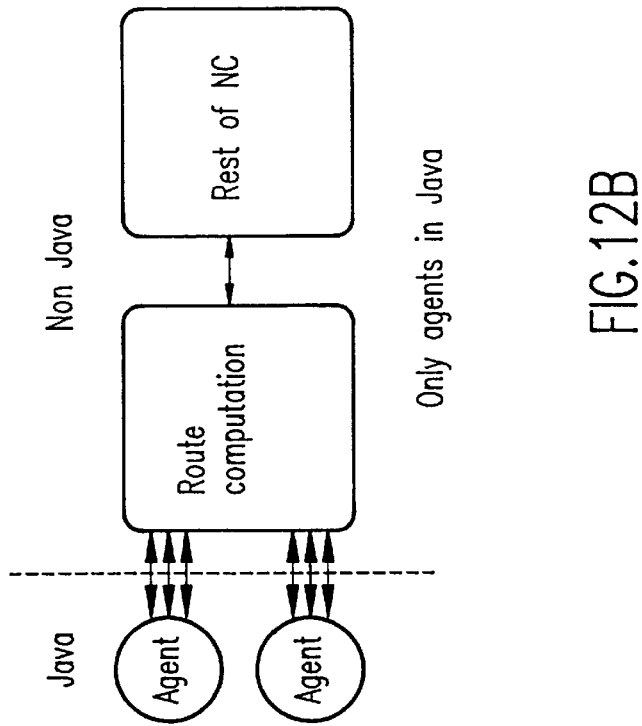
FIGS. 12A–B are diagrams showing alternatives for agent/network control interaction architecture.
Figure 12A:
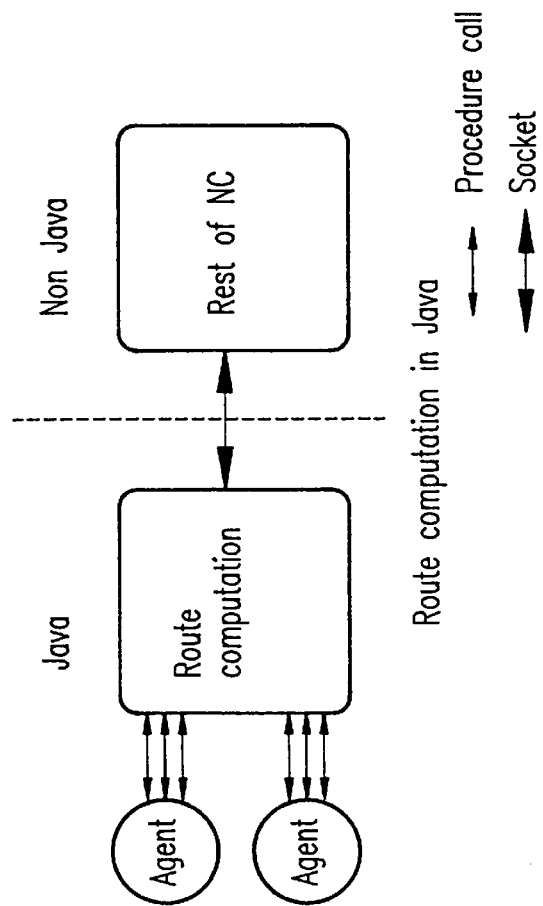

Referring now to FIG. 12, there are two main ways to design the interface:

a. In FIG. 12A, the route computation case and the agents are written in Java; hence, one can define a procedural interface to the agents. The interface between this part of network control and the rest of it is via sockets. A reasonable choice here would be to receive requests for routes via the sockets, compute them in Java and return the chosen route back via the socket. In this case this module serves as a "route computation server" to the rest of network control.

b. In FIG. 12B, only the agents are written in Java. Hence, on can define a socket interface to the agents. Thus, the agents will act as servers listening to several socket ports, preferably one port per agent interface (e.g., FindAddress). network control will convey the data of each query via the relevant socket and get the return value via this socket.

The advantage of architecture (a) is that it is much more efficient since, sockets involve non-trivial I/O, they cause a computational overhead which may be very significant. Since the route computation module is expected to frequently call the agents in the course of the computation, it is best to implement these interfaces as procedure calls. In solution (b) the socket is used only once per connection request, a relatively rare event.

The advantage of solution (b) lies in the security it may provide since, each agent runs as separate thread (or even a separate process), it has its own address space and cannot access the address space of the rest of network control, or of other agents. Furthermore, the interpreter running each agent can support additional security checks to ensure that the agent only accesses allowed resources. Similar ideas have already been implemented for untrusted Java applets, and their level of security is expected to improve with time.

While the invention has been described in terms of a single preferred embodiment, those skilled in the art will recognize that the invention can be practiced with modification within the spirit and scope of the appended claims.

I claim:

1. A method for routing data through a network comprised of dissimilar linked sub-networks by allowing an originating node to locally compute a path through said network, comprising steps of:

providing a network controller associated with said originating node;

providing at said network controller a plurality of agents, each of said agents representing a particular one of said sub-networks in said network;

computing a path through a subset of said plurality of sub-networks to a sub-network containing a destination address; and querying said agents representing said plurality of sub-networks in said subset for setup information necessary for each of said plurality of sub-networks in said path to pass said data through said sub-network, wherein said step of computing a path to said sub-network containing said destination address comprises steps of:

consulting a network topology database comprising map data for link connections between said sub- networks;

determining routing criteria for said data;

querying said plurality of agents, for which a path to said sub-network containing said destination address exists, regarding said criteria data; and selecting a path most closely meeting said criteria data.

2. A method for routing data through a network as recited in claim 1 wherein said step of determining routing criteria comprises a step of querying said plurality of agents for determining a minimum delay requirement for said data comprising minimum bandwidth requirements.

3. A method for routing data through a network as recited in claim 1 wherein said step of determining routing criteria comprises the step of querying said plurality of agents for determining an acceptable monetary cost requirement.

4. A method for routing data through a network as recited in claim 1 wherein said network is an optical wavelength division multiplexed network and wherein said step of determining routing criteria comprises a step of querying said plurality of agents for determining a feasible assignment of wavelengths to said sub-network containing said destination address.

5. A method for routing data through a network as recited in claim 1 further comprising the step of updating a particular sub-network's agent with topology data from said particular sub-network.

6. A method for routing data through a network as recited in claim 5 further comprising the step of encrypting said topology data.

7. A system for routing data through a network comprised of dissimilar linked sub-networks, by allowing an originating node to locally compute a path through said network, said originating node comprising:

a network controller means for controlling connection set-ups between said sub-networks;

a plurality of agents, each of said agents representing a particular one of said sub-networks in said network;

means for computing a path through a subset of said sub-networks to a sub-network containing a destination address;

means for querying said agents representing said sub-networks in said subset for setup information necessary for each of said sub-networks in said path to pass said data through, a network topology database comprising map data for link connections between said sub-networks;

means for consulting said network topology database;

means for determining routing criteria for data to be routed to said destination address;

means for querying said plurality of agents, for which a path to said sub-network containing said destination address exists, regarding said routing criteria; and means for selecting a path most closely meeting said criteria data.

8. A system for routing data through a network as recited in claim 7 further comprising means for determining a minimum delay requirement for said data comprising minimum bandwidth requirements.

9. A system for routing data through a network as recited in claim 7 further comprising means for querying said plurality of agents for determining an acceptable monetary cost requirement for transmitting said data from said originating node to said destination address.

10. A system for routing data through a network as recited in claim 7 further comprising means for updating a particular sub-network's agent with topology data from said particular sub-network.

11. A system for routing data through a network as recited in claim 10 further comprising means for encrypting said topology data.

12. A system for routing data through a network comprised of dissimilar linked sub-networks, by allowing an originating node to locally compute a path through said network, said originating node comprising:

a network controller means for controlling connection set-ups between said sub-networks;

a plurality of software agents residing locally at said network controller means, each of said agents representing a particular one of said sub-networks in said network;

means for computing a path through a subset of said sub-networks to a sub-network containing a destination address; and means for querying said agents representing said sub-networks in said subset for setup information necessary for each of said sub-networks in said path to pass said data through, wherein said network is an optical wavelength division multiplexed network and further comprises means for querying said plurality of agents for determining a feasible assignment of wavelengths to said sub-net containing destination address.

13. A computer readable medium containing code for operating a computer system to rout data through a network comprised of dissimilar linked sub-networks by allowing an originating node to locally compute a path through said network, the code for implementing the steps of:

providing a network controller associated with said originating node;

providing at said network controller a plurality of agents, each of said agents representing a particular one of said sub-networks in said network;

computing a path through a subset of said plurality of sub-networks to a sub-network containing a destination address; and querying said agents representing said plurality of sub-networks in said subset for setup information necessary for each of said plurality of sub-networks in said path to pass said data through said sub-network, wherein said step of computing a path to said sub-network containing said destination address comprises steps of:

consulting a network topology database comprising map data for link connections between said sub- networks;

determining routing criteria for said data;

querying said plurality of agents, for which a path to said sub-network containing said destination address exists, regarding said criteria data; and selecting a path most closely meeting said criteria data.

14. A computer readable medium containing code as recited in claim 13 wherein said step of determining routing criteria comprises a step of querying said plurality of agents for determining a minimum delay requirement for said data comprising minimum bandwidth requirements.

15. A computer readable medium containing code as recited in claim 13 wherein said step of determining routing criteria comprises the step of querying said plurality of agents for determining an acceptable monetary cost requirement.

16. A computer readable medium containing code as recited in claim 13 wherein said network is an optical wavelength division multiplexed network and wherein said step of determining routing criteria comprises a step of querying said plurality of agents for determining a feasible assignment of wavelengths to said sub-network containing said destination address.

17. A computer readable medium containing code as recited in claim 13 further comprising the step of updating a particular sub-network's agent with topology data from said particular sub-network.

18. A computer readable medium containing code as recited in claim 17 further comprising the step of encrypting said topology data.

* * * * *